(12) United States Patent
Saucedo

(10) Patent No.: US 10,077,921 B2
(45) Date of Patent: Sep. 18, 2018

(54) RE-REFLECTING PARABOLOID DISH COLLECTOR

(71) Applicant: Eduardo Saucedo, Raleigh, NC (US)

(72) Inventor: Eduardo Saucedo, Raleigh, NC (US)

( * ) Notice: Subject to any disclaimer, the term of this patent is extended or adjusted under 35 U.S.C. 154(b) by 854 days.

(21) Appl. No.: 14/513,715

(22) Filed: Oct. 14, 2014

(65) Prior Publication Data
US 2016/0102890 A1 Apr. 14, 2016

(51) Int. Cl.
| | |
|---|---|
| *F24J 2/38* | (2014.01) |
| *F24S 50/20* | (2018.01) |
| *F24J 2/12* | (2006.01) |
| *F24S 23/71* | (2018.01) |
| *F24J 2/06* | (2006.01) |
| *F24J 2/07* | (2006.01) |
| *F24J 2/18* | (2006.01) |
| *F24J 2/54* | (2006.01) |
| *F24J 2/10* | (2006.01) |

(52) U.S. Cl.
CPC ............... *F24S 50/20* (2018.05); *F24J 2/067* (2013.01); *F24J 2/07* (2013.01); *F24J 2/12* (2013.01); *F24J 2/18* (2013.01); *F24J 2/38* (2013.01); *F24J 2/5427* (2013.01); *F24S 23/71* (2018.05); *F24J 2002/1071* (2013.01); *F24J 2002/1085* (2013.01); *F24J 2002/5465* (2013.01); *F24J 2002/5493* (2013.01); *Y02E 10/41* (2013.01); *Y02E 10/42* (2013.01); *Y02E 10/47* (2013.01)

(58) Field of Classification Search
CPC ........ F24J 2/18; F24J 2/067; F24J 2/54; F24S 50/20

USPC ......................................... 126/606, 607, 569
See application file for complete search history.

(56) References Cited

U.S. PATENT DOCUMENTS

| | | | | |
|---|---|---|---|---|
| 4,233,127 A | * | 11/1980 | Monahan ............... | B01J 19/127 204/157.5 |
| 4,841,946 A | * | 6/1989 | Marks ........................ | F24J 2/02 126/575 |
| 6,031,958 A | * | 2/2000 | McGaffigan ..... | B29D 11/00663 362/555 |
| 6,603,069 B1 | * | 8/2003 | Muhs ..................... | C12M 21/02 126/683 |

(Continued)

FOREIGN PATENT DOCUMENTS

EP 3179177 A1 * 6/2017 .............. F16B 2/065

*Primary Examiner* — Avinash Savani
*Assistant Examiner* — Aaron Heyamoto

(57) ABSTRACT

The present invention relates to an improved solar energy concentrating system. The system comprises a dual axis sun tracking paraboloid dish collector on a polar mount, with a re-reflecting mirror in top of the paraboloid dish, which reflects the concentrated solar irradiation into an opening in the paraboloid dish into a light pipe and with a movable third mirror redirects the light into a second light pipe along the polar axis, which with a fourth fixed mirror, sends the concentrated solar irradiation into a third light pipe to the cavity receiver. The invention replaces the need of flexible connectors to accommodate the movement of the mirror, with a combination of mirrors and light pipes, transferring the solar irradiation to a cavity-receiver. Dual axis tracking systems can capture more solar energy, on a more constant basis throughout the day and the year, and by reflecting directly into the cavity-receiver, thermal losses are minimized.

8 Claims, 12 Drawing Sheets

(56) References Cited

U.S. PATENT DOCUMENTS

| | | | | |
|---|---|---|---|---|
| 7,374,137 B2* | 5/2008 | Staney | ............... | F16M 11/10 |
| | | | | 108/10 |
| 8,471,142 B1* | 6/2013 | Yu | ............... | H01L 31/0525 |
| | | | | 136/246 |
| 9,335,015 B2* | 5/2016 | Freier | ............... | F24J 2/067 |
| 9,675,955 B2* | 6/2017 | Chen | ............... | B01J 19/127 |
| 2009/0321244 A1* | 12/2009 | Smith | ............... | B01J 19/127 |
| | | | | 204/157.52 |
| 2011/0056484 A1* | 3/2011 | Rogers | ............... | F24J 2/5427 |
| | | | | 126/600 |

* cited by examiner

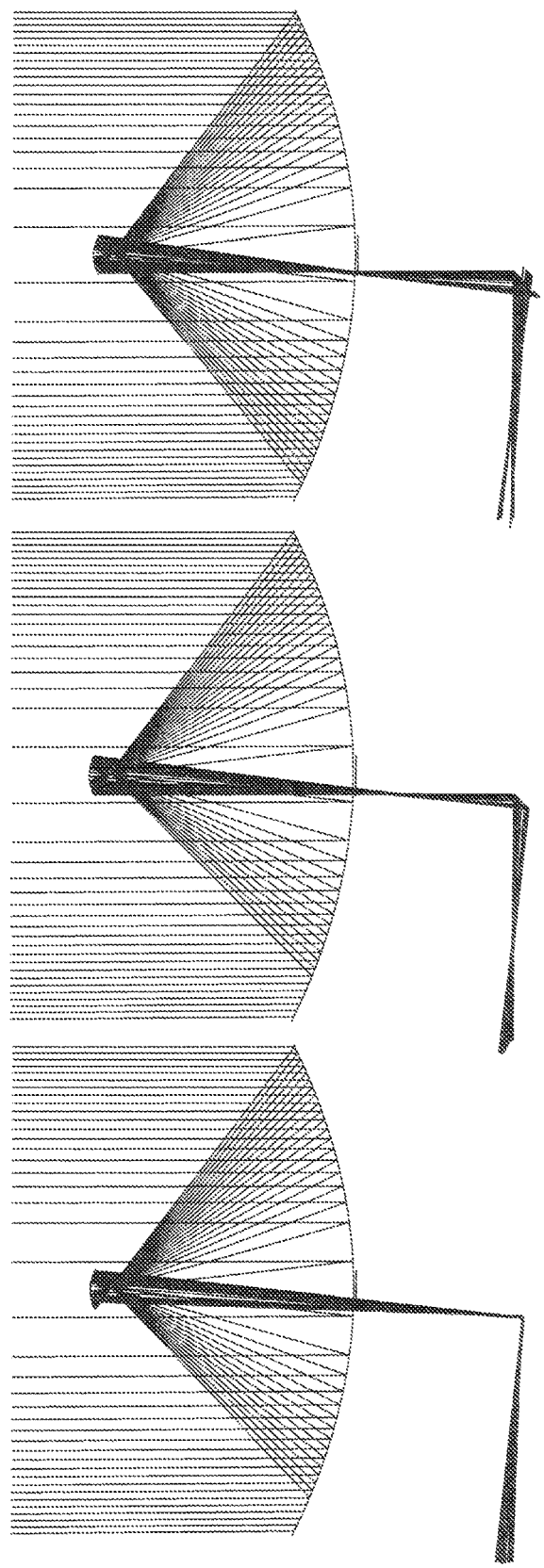

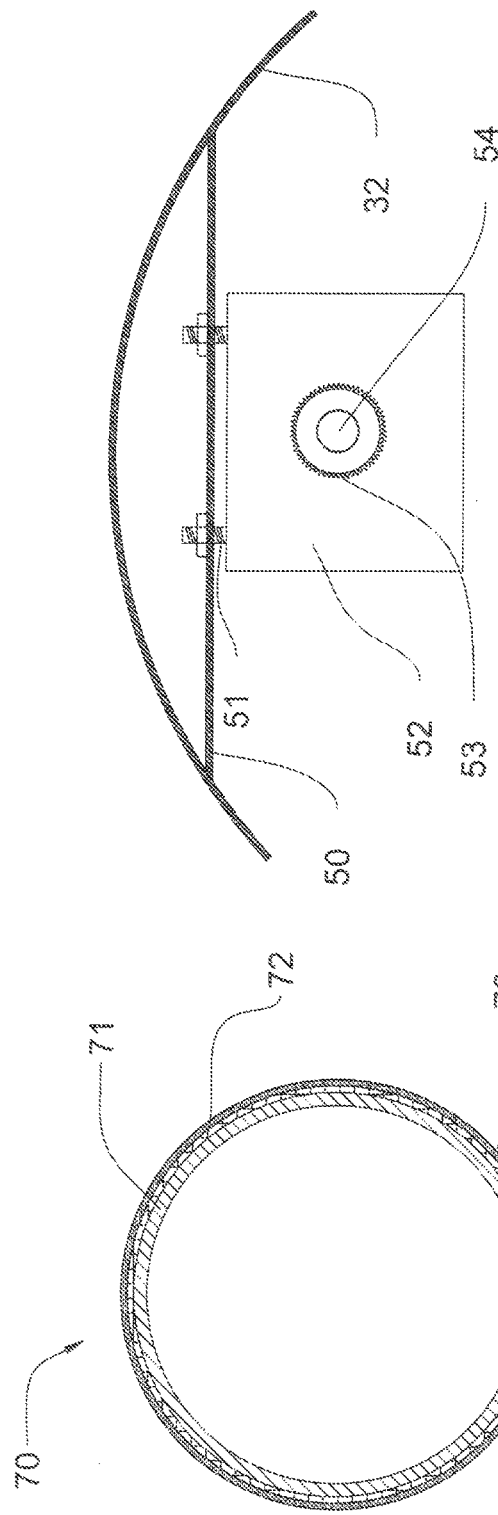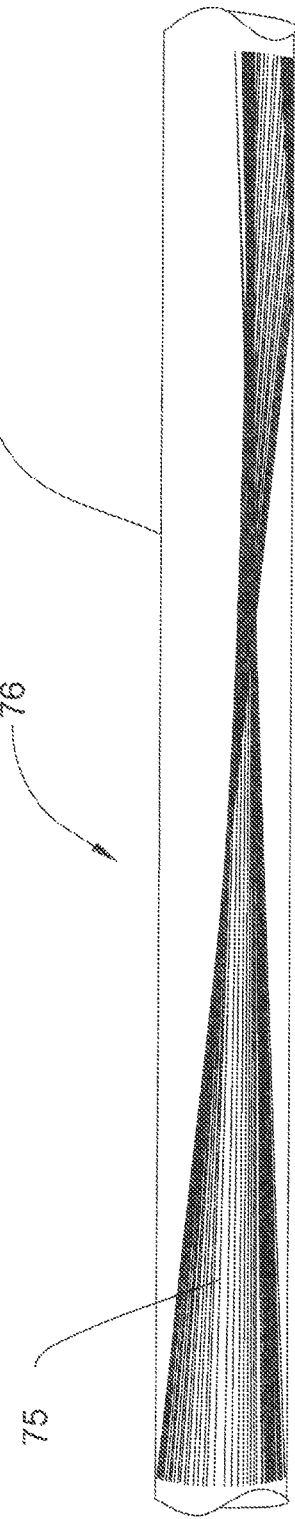
FIG. 7A
FIG. 7B
FIG. 7C

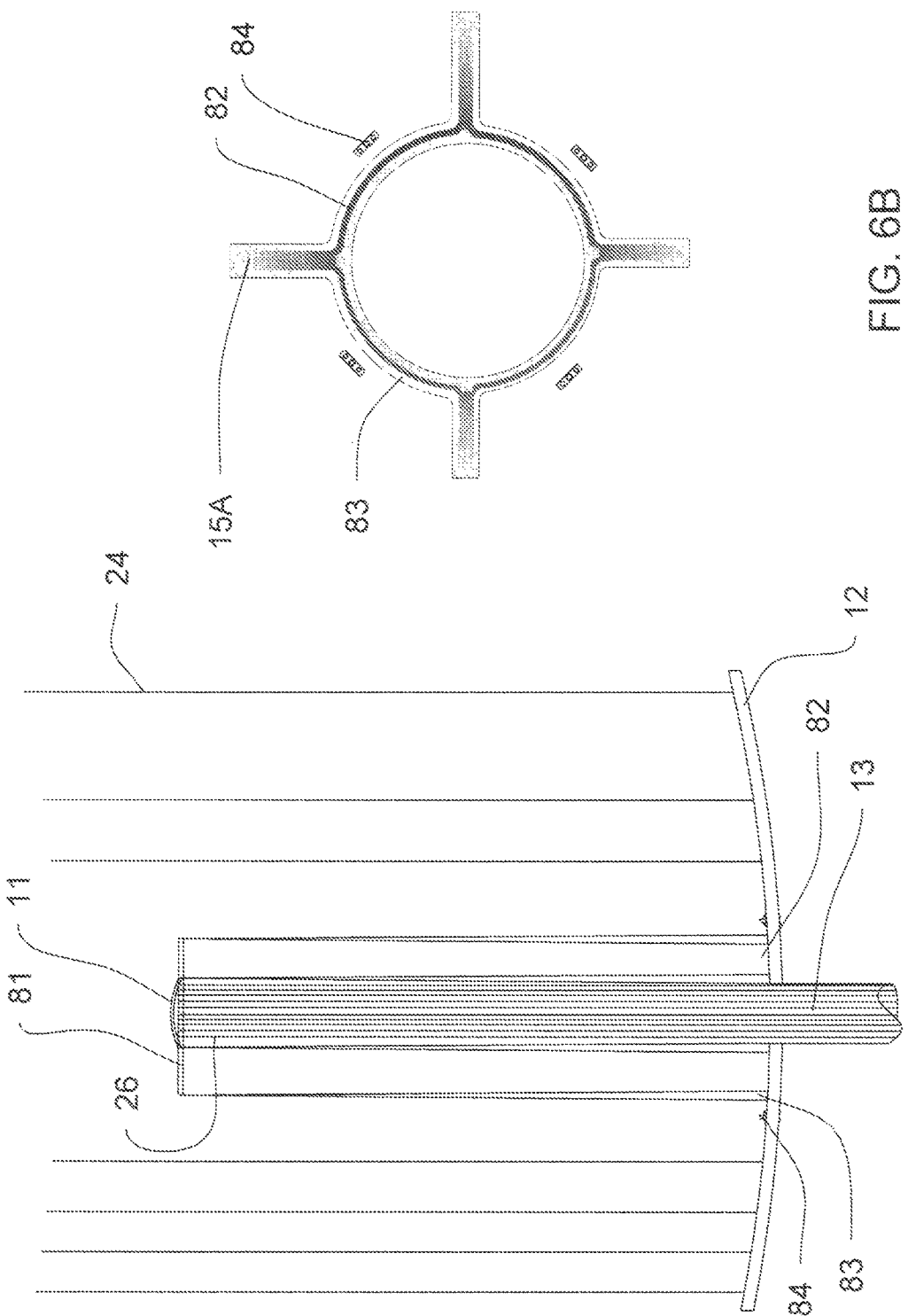

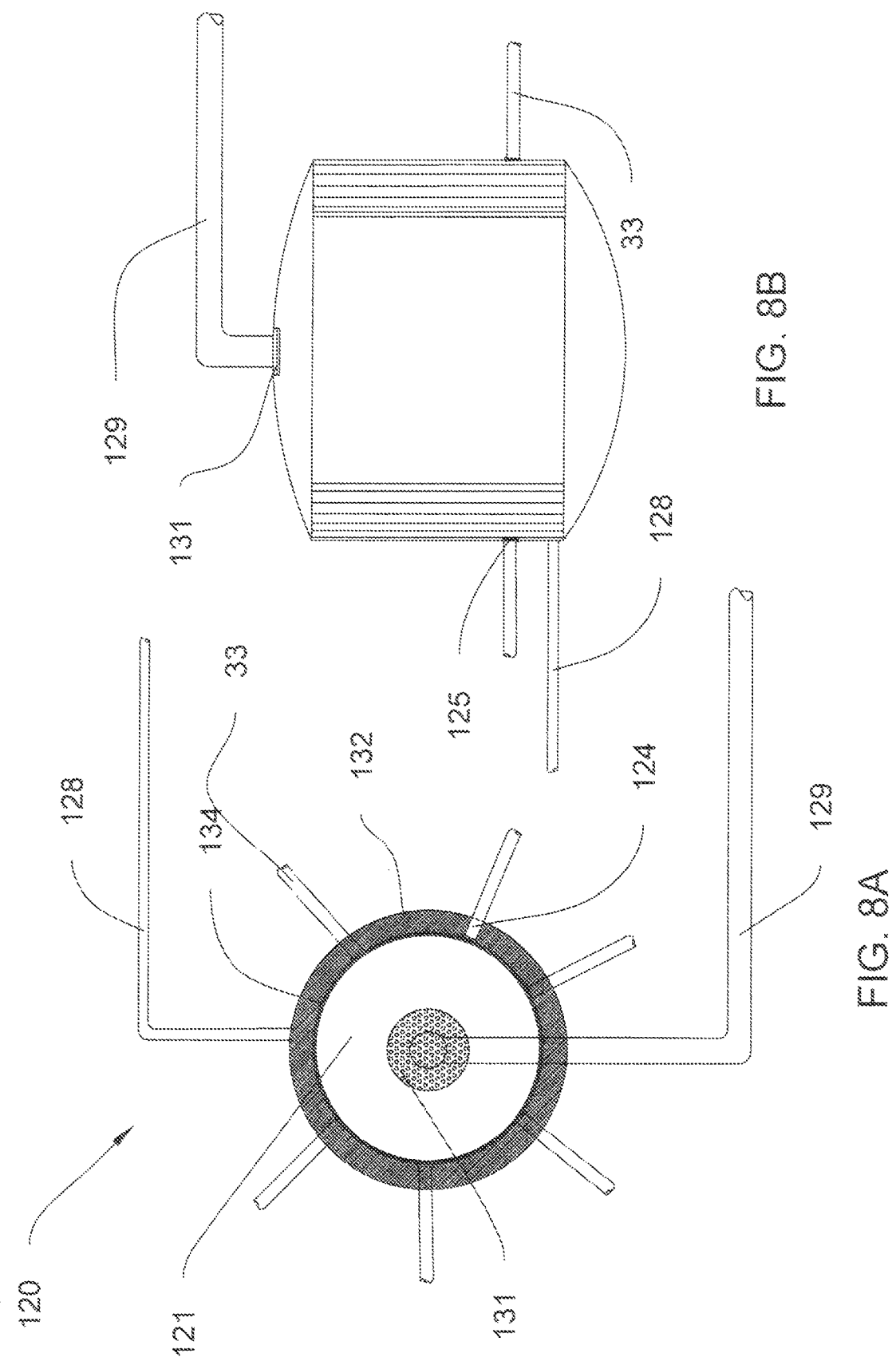

RE-REFLECTING PARABOLOID DISH COLLECTOR

BACKGROUND OF THE INVENTION

For the last century, numerous researchers and inventors have come up with clever ideas to harness the solar irradiation in an efficient and inexpensive way to produce electricity. The pace of research has substantially increased during the last decades with high fossil fuel prices and awareness of the implications of releasing $CO_2$ into the atmosphere.

The amount of solar irradiation impinging daily the earth is huge, yet the resource is feeble and constantly changing and despite best efforts, even the last commercial installations are still too expensive and have low inefficiencies. Notwithstanding the substantial price reduction of photovoltaic panels ("PV panels"), without inexpensive storage, PV panels do not offer a solution.

Solar thermal with thermal storage appears to be a better option, but the price is still too high to be competitive. Most solar thermal commercial operations utilize trough sun tracking parabolic mirrors, but in 2012, two large plants utilizing flat heliostats hitting a central receiver in a tower were installed in Ivanpah, Calif. and Crescent Dunes, Nev. A third option, utilizing a parabolic dish, with a Stirling engine at the focal point started operation in Maricopa, Ariz. in 2010, but filed for bankruptcy protection in 2012.

Fixed collectors cannot reach high temperatures even for a few hours and therefore are not used to generate electricity. Sun tracking parabolic trough consists of long lines of collectors, held horizontally, oriented North-South tracking the sun's movement from East to West. Unfortunately such arrangement suffers substantial cosine losses, especially in the winter. Inclining the collectors to ameliorate the cosine losses, poses insurmountable problems. The structure will have to be heavy and rigid to withstand wind, yet light so that the mirror could be moved to track the sun. State of the art plants require about 10,000 $m^2$ per installed MW.

Heliostats are relatively flat mirrors with dual axis sun tracking. Each individual mirror moves independently, aiming to reflect sunlight into the central power. The particular cosine losses of each mirror depend on the position of the mirror with respect to the tower and the location of the sun. Overall, they are more efficient than the single axis sun tracking parabolic collectors, requiring about 7,000 $m^2$ per installed MW, but since each mirror is only about 15 $m^2$, it requires a large number of mirrors, each one with its own tracking controller and sensors. The Ivanpah's installation has 173,000 mirrors for a total area of 2,600,000 $m^2$.

Dual axis sun-tracking paraboloid dishes have several advantages: normal direct irradiation is higher than horizontal irradiation (there are no cosine losses) and it is more evenly distributed both during the day and during the year. Overall, dual axis sun tracking paraboloid dishes could capture about 36% more solar energy on a yearly basis.

However, they have several disadvantages: (a) to capture meaningful amounts of energy the mirror needs to be large which adds complications to the sun tracking mechanism and offers more wind resistance; (b) to achieve high temperatures, a high concentration ratio is required, which implies a very accurate tracking mechanism, and; (c) the arrangement requires flexible yet leak proof connections for transporting the working fluid into and away from the focal point. After constructing a couple of demonstration units, the consensus reached was that the paraboloid dishes were not a very promising avenue. Mounting Stirling engines on top of a paraboloid dish simplified the tracking accuracy and the need of flexible connections, but difficulties with the Stirling engines failed to offer a competitive solution.

The present invention relates to the use of a dual axis sun tracking paraboloid dish collectors with a re-reflecting mirror above the focal point of the paraboloid dish, re-reflecting the concentrated light into an opening on the paraboloid dish, where the light is transmitted via light pipes to a cavity-receiver operating at high temperature. Several collectors clustered together could feed a single cavity-receiver and generate hundreds of kW.

PRIOR ART

Efforts to capture solar energy to produce steam are more than 150 years old (August Mouchot-1860). Sun-tracking parabolic reflectors are more than 100 years old. Frank Shuman applied for patent Ser. No. 1,240,890 in Sep. 30, 1912 for a Sun Boiler that comprises, among other things, a sun tracking parabolic collector.

More recently, Niedermeyer (U.S. Pat. No. 4,340,031-Jul. 20, 1982) proposed a way of constructing a concave paraboloid reflector surface supported on a plurality of parabolically shaped segments extended radially, mounted on a base that rotates with a plurality of wheels along a track and with means of changing the horizontal inclination of the reflector, with an absorber mounted on the focal point, with fluid flowing inside the absorber support base and transferring the heat captured to heat transfer equipment located within the base. Since no details are offered as to the mechanism to transfer the hot working fluid from a tilted reflector, it is assumed that the solution is a flexible connector.

Even more recently, Cordy (U.S. Pat. No. 5,347,986-Sep. 20, 1994) provided a detailed analysis of paraboloid dish collector problems and proposed a light weight point focus reflector in a light weight cradle which is gimbal mounted with a receiver cavity mounted at the focal point and a rather long plumbing system, its length calculated to provide the desired flexibility without flexible joints, with a hybrid tracking system with four photo detectors in the central part of the collector dish to provide correction, if needed, to the tracking mechanism.

Last year, Coffey et al (U.S. Pat. No. 8,479,515-Jul. 9, 2013) offered another parabololid dish system, fitted into a polar mount and with a mast on the dish where a boiler is mounted, with an insulated supply line and an insulated hose inside the mast carrying the water and steam to a turbine below.

Finally, Falcey's recent patent (U.S. Pat. No. 8,752,379-Jun. 17, 2014) offers an interesting possibility for a hybrid system, using a solar concentrator and fiber optic cables that transfer the collected solar radiation to a solar thermal converter which is used to augment the heating of a working fluid in a boiler. Falcey recognizes that there is a substantial loss of energy in the fiber optic and immerses it in an optical cooling system that pre-heats the working fluid.

While these patents offer interesting insights and possibilities, they still have to contend with a moving reflector and the need to have flexible connectors to transfer the working fluid into the receiver and the steam to the heat exchanger apparatus.

OBJECTIVES AND ADVANTAGES

The object of this invention is to enhance: (i) the amount of energy that can be captured by a given area; (ii) minimize the thermal losses for a more efficient operation, and; (iii) reach high temperatures for improved efficiency of electricity generation or other uses requiring high temperatures, such as thermo-chemical or photo-chemical reactions.

It is an object of the present invention to provide for a simpler and accurate tracking mechanism, which should be able to track the sun with accuracies of less than 0.1° (1.7 mrads).

It is a further object of the present invention to construct optically efficient large mirrors, built with a plurality of small (about 1 m²) mirrors with spacing between the mirrors to ameliorate the wind resistance and with a light structure capable of withstand strong winds without deforming.

It is a further object of the present invention to eliminate the need of flexible connectors to transfer the working fluid back and forth to the focal point, by re-reflecting the concentrated solar irradiation to a fixed point where it can be utilized by a heat exchanging apparatus.

It is a further object of the present invention to utilize light pipes to direct the concentrated solar irradiation to the desired location, by providing strategically placed mirrors along the path to change the direction of the light rays.

It is a further object of the present invention to redirect the concentrated solar irradiation into a solar cavity or solar furnace where the solar irradiation could be used to boil a working fluid to generate electricity by conventional ways, or to use it in other applications requiring high temperature.

SUMMARY OF THE INVENTION

The present invention provides for a practical and economical way of meeting the objectives listed above while minimizing its limitations.

A paraboloid dish mirror (geometric form created by rotating a parabola along its main axis) concentrates incoming radiation into a focal point. The amount of solar energy captured by any collector is proportional to its area. Given the expected efficiencies, a small parabolioid dish (1 m radius) should be able to capture sufficient energy to generate about 4 kWh/d. Such small capture is not really worth the effort. On the other hand, a 6 m radius paraboloid dish might be able to capture some 160 kWh/d, or almost 20 kWh if operating for a period of eight hours, but now presents a big challenge to track the sun accurately and to resist the wind. While these problems will eventually be overcome, a paraboloid dish with a radius of about 4 m with an area of about 50 m², capable of generating some 72 kWh/d appears to be a practical compromise. For a given area, the shape of the mirror depends on the eccentricity of the parabola. Small eccentricity produces flatter mirrors with longer focal length, which requires better tracking accuracy. Within limits, a 4 m radius mirror with a focal point at about 2 m represents a reasonable compromise.

The main challenge with the proposed re-reflecting parabolid dish collector ("RPDC") is the accuracy and precision required. The misalignment tolerance for high concentration ratios is very small but on the other hand it is desirable to have the re-reflecting mirror and consequently the light pipes as small as possible which implies higher concentrations. If the radius of the small mirror is 10% of the radius of the main mirror, the theoretical geometric concentration ratio ("CR") would be 100 and will require a tracking accuracy of about 0.25° (4.4 mrads), while if the radius of the reflecting mirror was only 5% of the radius of the main mirror, the possible CR would be 400 but the tolerance to deviations on the tracking accuracy is reduced to 0.1° (1.7 mrads). For the proposed 4 m radius mirror, if the radius of the reflecting mirror is 5% of the main mirror, the re-reflecting mirror and light pipe will have a radius of 20 cm (40 cm or 16" diameter).

A small misalignment of 0.25° (4.4 mrads) could result in the re-reflecting rays missing the opening in the main mirror, and in subsequent zigzagging of the light rays inside the light pipe. A good mirror with 95% reflectivity will lose 5% of the potential energy captured with each bounce. Obviously, minimizing the number of bounces is critical. Great accuracy and precision is required in the tracking mechanism, in building a near perfect mirror that will not be deformed by the wind and in the construction of the mirror.

To ameliorate the wind effects, the main mirror will be constructed with a plurality of paraboloid mirror segments, each about 1 m², with some spacing between the segments and even some small circular holes in the mirror segments, to allow the air to pass through the mirror and thus reducing the size and weight of the structure needed for maintaining the shape of the mirror.

There are two methods used for tracking the sun movements: (a) an altitude-azimuth mechanism, or; (ii) a polar mount mechanism. The polar mount mechanism is simpler and more predictable and likely to require less maintenance, but requires: (i) accurate aiming to True North, the exact place that represents the location of the axis of rotation of the Earth (the Polar Star is slightly off True North); (ii) an inclined plane, and; (iii) is usually mounted on a pole. The altitude-azimuth requires either sensors and/or controller to move almost simultaneously the PRDC along the altitude and azimuth axes and while the tracking mechanism usually results in uneven stepwise movement, its main advantage is that it is usually based on a horizontal platform. A main advantage of the polar mechanism is that it is easier to redirect the reflected rays along the two axes to a fixed point and from there to the cavity-receiver.

While a simplified embodiment of the invention have been enunciated and will be further described in detail below, it will be apparent to those of skill in the art that various modifications and substitutions may be made thereto and that the invention intends to cover all such modifications and substitutions that fall within the scope of the appended claims as might be understood from the foregoing written description.

BRIEF DESCRIPTION OF THE DRAWINGS

The present invention will become more fully understood from the detailed description given herein below and the accompanying drawings which are given by way of illustration only and thus are not limitative of the present invention and wherein:

FIGS. 2B, 2C and 2D shows similar ray diagrams with the sun coming 0.3° away from the axis of the paraboloid, with minute changes on the location and the eccentricity of the re-reflecting mirror.

FIG. 4 shows an exploded view of the moving mechanism to rotate the RP DC along the polar axis to follow the sun's movement on the celestial sphere and FIG. 7C shows a lateral view of a segment of the polar base with the complementary mechanism.

FIG. 7C shows the complementary moving mechanism with a servo motor attached to the axis base.

FIG. 6A shows a side view of the main and re-reflecting mirror depicting the shade provided by a shadowing ring and the location of photo-detectors to assist in the tracking accuracy while FIG. 6B shows a top view of said arrangement.

FIG. 7A shows a front view of a light pipe and FIG. 7B shows a ray diagram of light traveling inside the light pipe when there is a slight angle of the rays with respect to the angle of the pipe.

FIG. 8A shows a composite top view of a cavity receiving the cavity light pipes and FIG. 8B shows a composite side view of said cavity.

Finally.

DETAILED DESCRIPTION OF THE PREFERRED EMBODIMENTS

Figure 1:
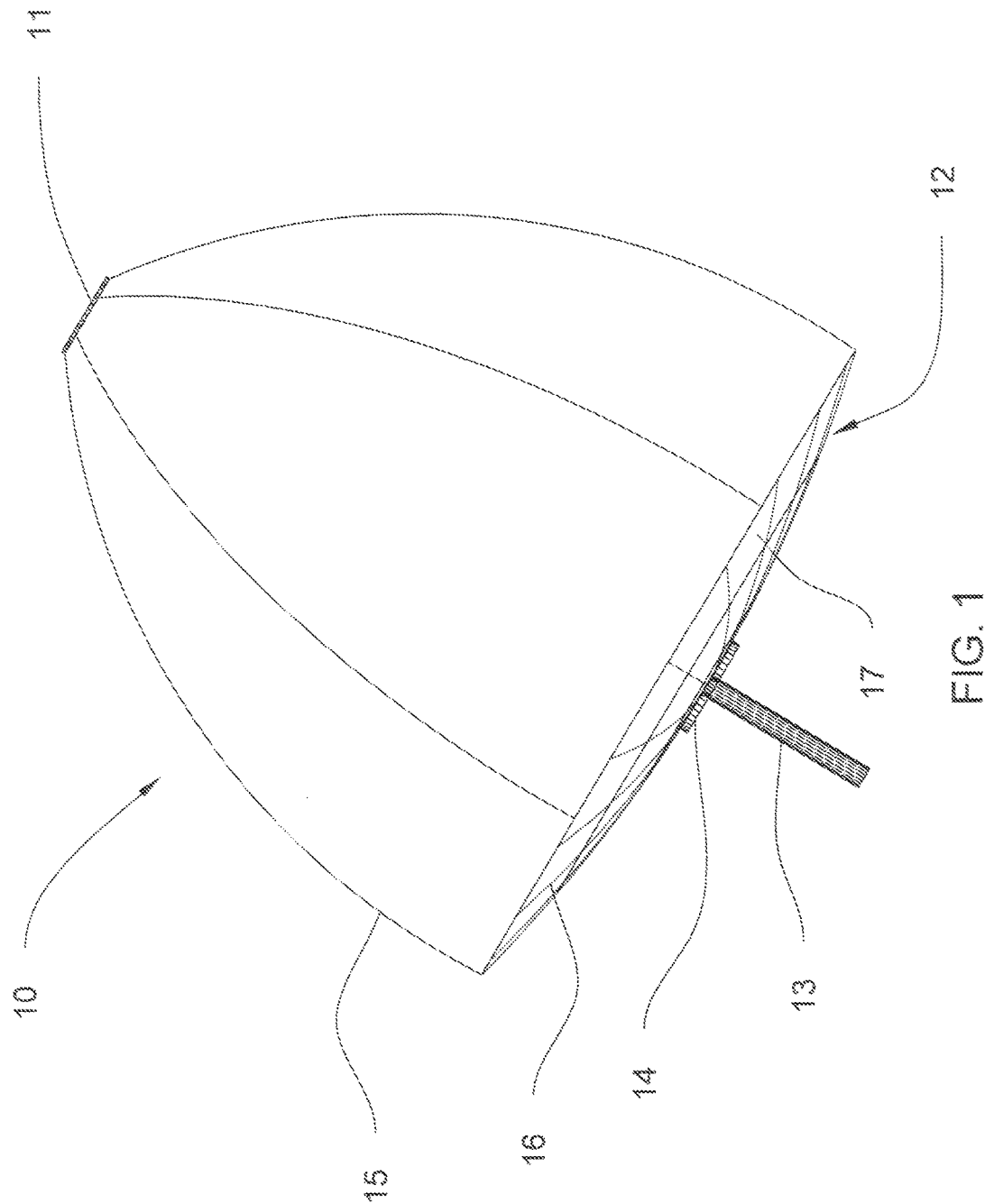
FIG. 1 illustrates a slanted view of the re-reflecting paraboloid dish solar collector ("RPDC") with a re-reflecting mirror above the mirror and a light pipe segment at the bottom of said paraboloid dish

FIG. 1 shows a simplified sketch of a tilted view of the RPDC 10, the object of the invention. The system consists of a paraboloid dish mirror or main mirror 12, formed by a plurality of segments of paraboloid mirrors 17 constructed and supported with a metallic structure 16 to maintain the shape of the main mirror even through strong winds, with a re-reflecting mirror 11 supported above the paraboloid dish mirror by a plurality of metallic struts 15 attached to the outmost ring of said metallic structure. The metallic structure is attached and supported by a central support disk 14 which holds the metallic structure together. The central support disk is a large disk, about 20% of the radius of the main mirror, which might be flat in the back and concave in the front facing the main mirror, and with engraved channels where the inner part of the metallic structure is placed and fastened, providing support and rigidity. A central light pipe 13, fully described on FIG. 7 is attached to a perforation at the center of the main mirror, passes through a hole in the central support disk and goes to the polar axis of rotation of the RPDC. Details of construction of the main mirror are given in FIG. 9.

In the ideal case with rays coming parallel to the axis of the paraboloid dish mirror, with a perfect mirror and perfect alignment, the eccentricity and location of the re-reflecting mirror is predefined mathematically, based on the dimension and eccentricity of the paraboloid dish mirror. The desired theoretical geometric concentration ratio of the system is defined by ratio of the area of the main mirror to the area of the re-reflecting mirror. The eccentricity of the re-reflecting mirror is proportional to the eccentricity of the main mirror times the ratio of the radius of the main mirror to the radius of the re-reflecting mirror. Finally, the re-reflecting mirror is located along the line connecting the focal point of the main mirror with the center of the said main mirror, at such distance that corresponds to the summation of the focal points of the two mirrors.

Figure 2A:
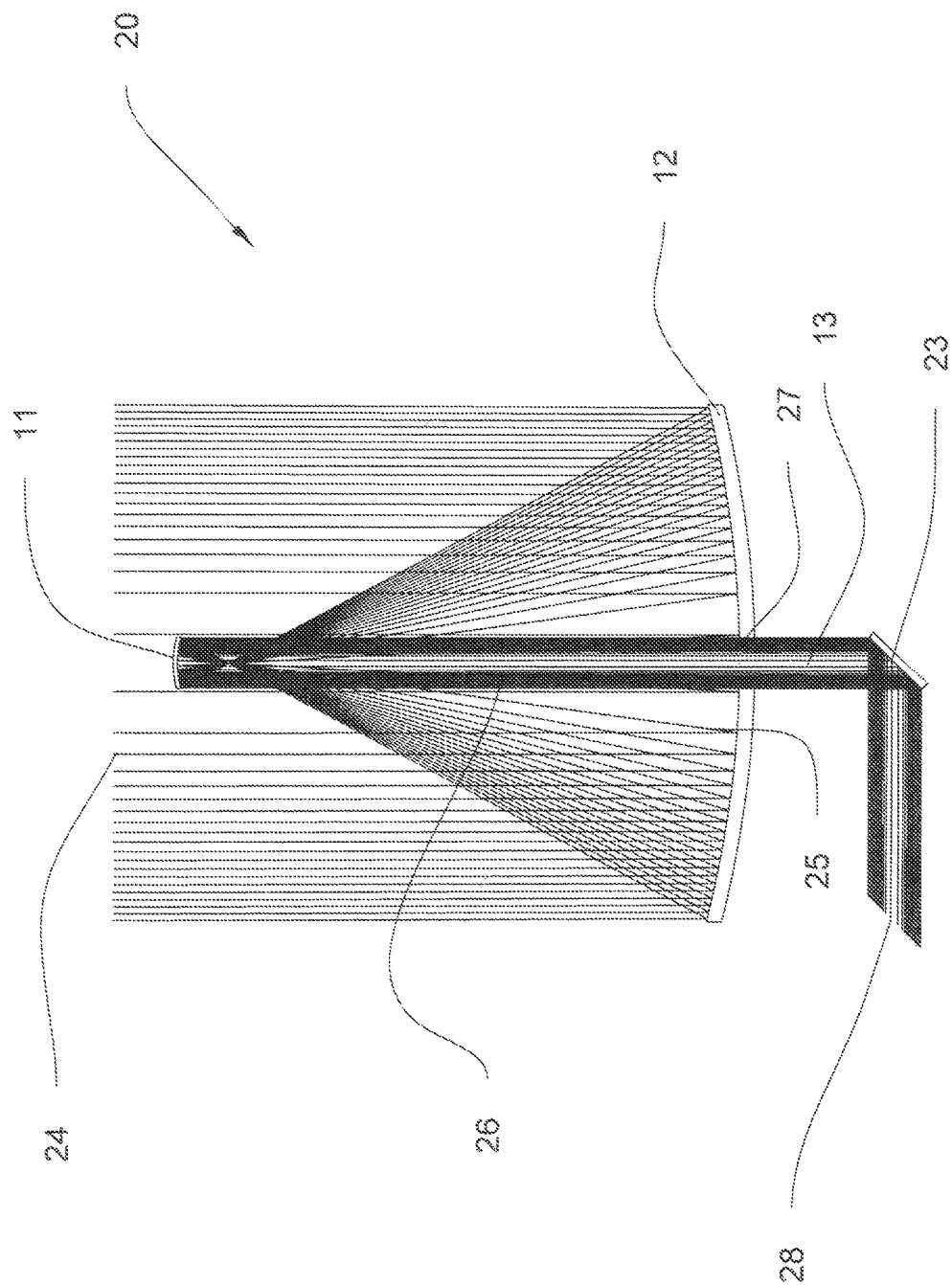
FIG. 2A illustrates a ray diagram superimposed on a lateral view of the RP DC and a re-reflecting mirror, showing the rays impinging on the main dish being reflected into the top re-reflecting mirror and re-reflected to the bottom of the dish, where they are collected into the light pipe and then with a 45 degree mirror, sent into another pipe.

FIG. 2A shows a simplified ray diagram of a lateral view of the RPDC, herein referred as 20. Common elements with the RPDC 10 shown in FIG. 1 have the same reference number. Sun rays 24 impinging in the main mirror are shown almost vertically, but not parallel. The sun rays coming at the left hand side of the main mirror are assumed to be coming at an angle of 90.25° with respect to an horizontal line (not shown) connecting the lips of the main mirror, while the sun rays coming from the right hand size of the main mirror are coming at an angle of 89.25° with respect to the same horizontal line, to mimic the sun's size. The impinging solar rays are shown with a greater density at the extremes of the main mirror than in the center, to represent that solar radiation is constant over an area and this is a two dimensional drawing. The reflected rays 25 are the inclined rays shown to be emanating from the main mirror converging at a point slightly below the re-reflecting mirror. The re-reflected rays 26 are the almost vertical rays coming down from the re-reflecting mirror which pass through the opening or hole 27 in the main mirror, into the central light pipe 13 (not shown, but inferred) and continue down until the re-reflected rays hit the axial mirror 23 that modifies and directs the re-reflected rays in the new direction in the axial light pipe 28 (not shown but inferred).

FIG. 2A shows the idealized case, where the sun rays are parallel to the axis of the parabola or perpendicular to the horizontal line connecting the lips of the main mirror, with the re-reflecting mirror having the pre-defined eccentricity and such re-reflecting mirror is located at the exact distance defined as the summation of the two mirrors focal points. FIGS. 2B to 2D show examples of possible scenarios when the sun rays are coming only 0.3° (about 5.25 mrads) of the axis of the paraboloid dish. FIG. 2B has the location and eccentricity of the re-reflecting mirror at the pre-defined position, while FIG. 2C has the re-reflecting mirror moved slightly forward (less than 0.25% of the combined focal lengths) and FIG. 2D has the re-reflecting mirror in the position used in FIG. 2C but also has modified the eccentricity of the re-reflecting mirror (about 10% of the pre-defined eccentricity). The labels of FIG. 2A are applicable to FIGS. 2B to 2D, but are not included to avoid cluttering the figures.

FIGS. 2B to 2D are illustrations only of the effects that small misalignment would have on the RP DC and the possibility of cures that could be used a priori to prevent or correct unavoidable slight misalignments or deviations. The collectors illustrated in FIGS. 2B, 2C and 2D collect 57%, 82% and 92%, respectively, of the incoming rays. The need for accuracy and precision are exacerbated with higher concentration ratios.

Comparing the ideal ray diagram shown in FIG. 2A, with some possible outcome in the event that there is a small misalignment, shown in FIGS. 2B-2D also illustrate that the conservation of angular momentum could create new problems (bouncing of the light rays on its trajectory along the light pipe) and it is obvious that the best strategy is to minimize misalignments. While a misalignment of 0.25° appears minor, that misalignment coupled with the divergence of the sun rays that are not totally parallel and the need to re-reflect the majority of the rays even if there is a small misalignment, might suggest that having the re-reflected mirror concentrate the rays slightly could be a good solution. However, because of conservation of angular momentum, after the new focus, the rays will start again diverging. Placing additional mirrors or lenses always implies the penalty that some of the energy will be absorbed by the additional mirror or lenses, rather than in the cavity-receiver.

Constructing a one piece large paraboloid dish is difficult, expensive and would represent a big transportation challenge. While constructing and assembling a multi-segmented precise mirror in the field also poses great difficulties, assembling prefabricated tightly fitting precise parts might allow achieving the desired tolerances.

Figure 9:
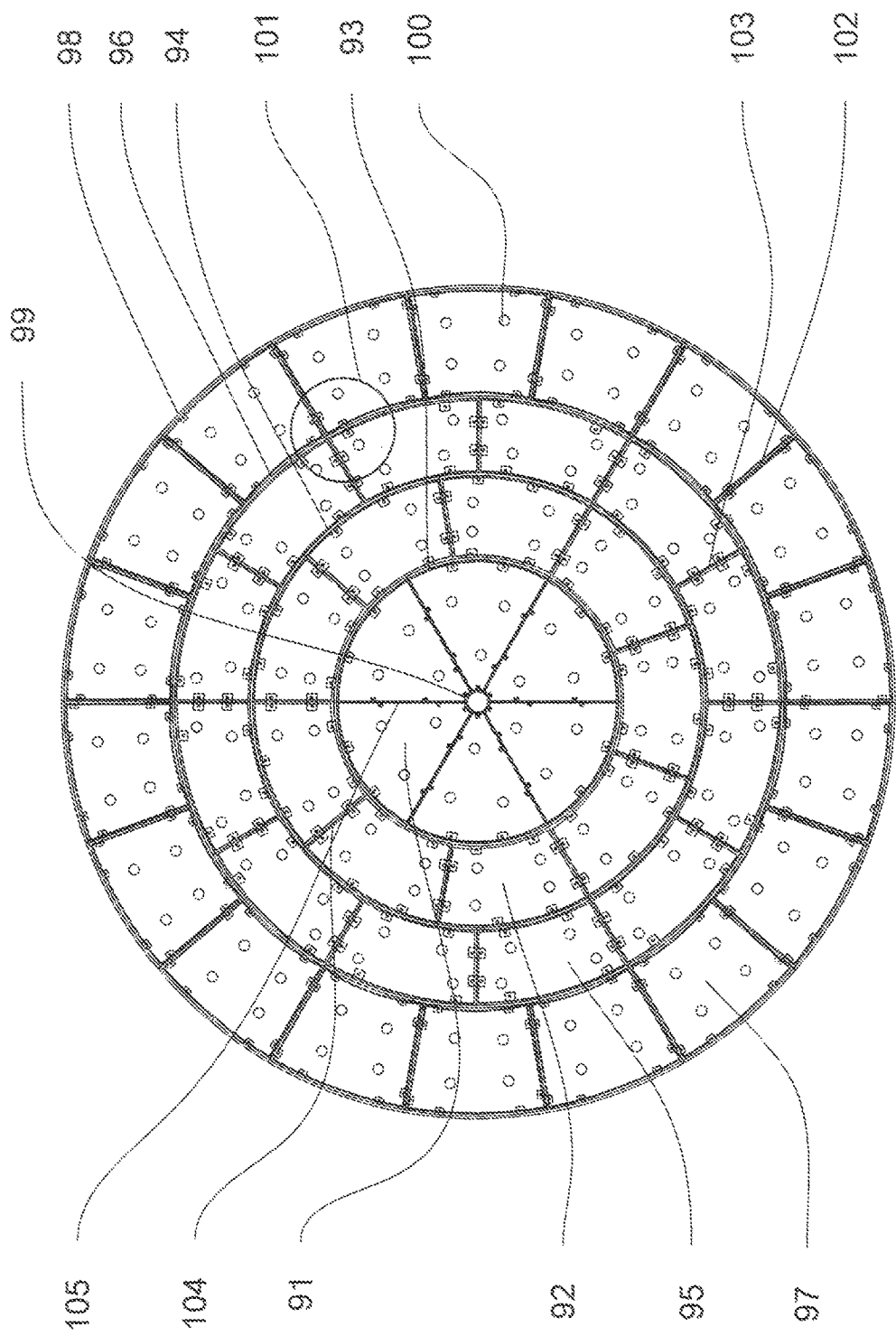
FIG. 9 illustrates a top view of the proposed integration of the paraboloid dish depicting the shape and method of forming the metallic structure to support the paraboloid dish and FIG. 10 shows a magnified view of a portion of the mirror to illustrate the opening between the glass mirror and the frame and perforations in the mirrors to minimize the resistance to wind.

FIG. 9 shows the main mirror formed by a plurality of paraboloid mirror segments. In this illustrative embodiment, the main mirror is composed of four concentric donuts, each donut containing a plurality of similar paraboloid mirror segments. The structure or frame supporting the mirrors consists of five concentric circles and a plurality of radial struts connecting the concentric circles alongside each of the mirror segments. Each circle is formed by a plurality of arc segments attached to connectors. Some connectors might be T-connectors, attaching two arc segments with a strut, but other connectors might be symmetric X-connectors connecting two arc segments but also with a lower and an upper strut. In this illustrative embodiment, the main mirror is composed of six similar internal inner circle mirror segments 91, forming a circle with a radius of about 1.4 m followed by nine first donut mirror segments 92 of the first donut formed by a structural first circle 93 and a structural second circle 94 of about 2.2 m of radius, followed by a second donut with 15 second donut mirror segments 95, formed by the structural second circle and a structural third circle 96 of about 2.9 m of radius, and the external donut with 18 outer circle mirror segments 97, formed by the structural third circle and a structural external circle 98 with a radius of about 3.8 m. While other dimensions can work, the illustrative embodiment shows that only four shapes of mirrors are required. Each mirror, a segment of the chosen paraboloid is about 1 m$^2$, made out of thermally shaped glass, as typically made by the automotive industry with conventional mirror and protective layers attached to the back thereto. The main mirror structure is formed by the structural inner circle 99 and structural circles 93, 94, 96 and external circle 98, with each circle formed by identical arc segments and by a plurality of identical (for each donut) radial struts connecting each of the five circles. The struts are a segment of the parabola that defines the main mirror. Radial struts connecting two circles might have different shape or overall length, but the struts between two circles will be identical, thus all struts 102, 103, 104 and 105 are identical among themselves, but designated strut 102 is different from other numbered struts. The connectors will be similar within a concentric circle, but different connectors will be needed for each concentric circle.

Figure 10:
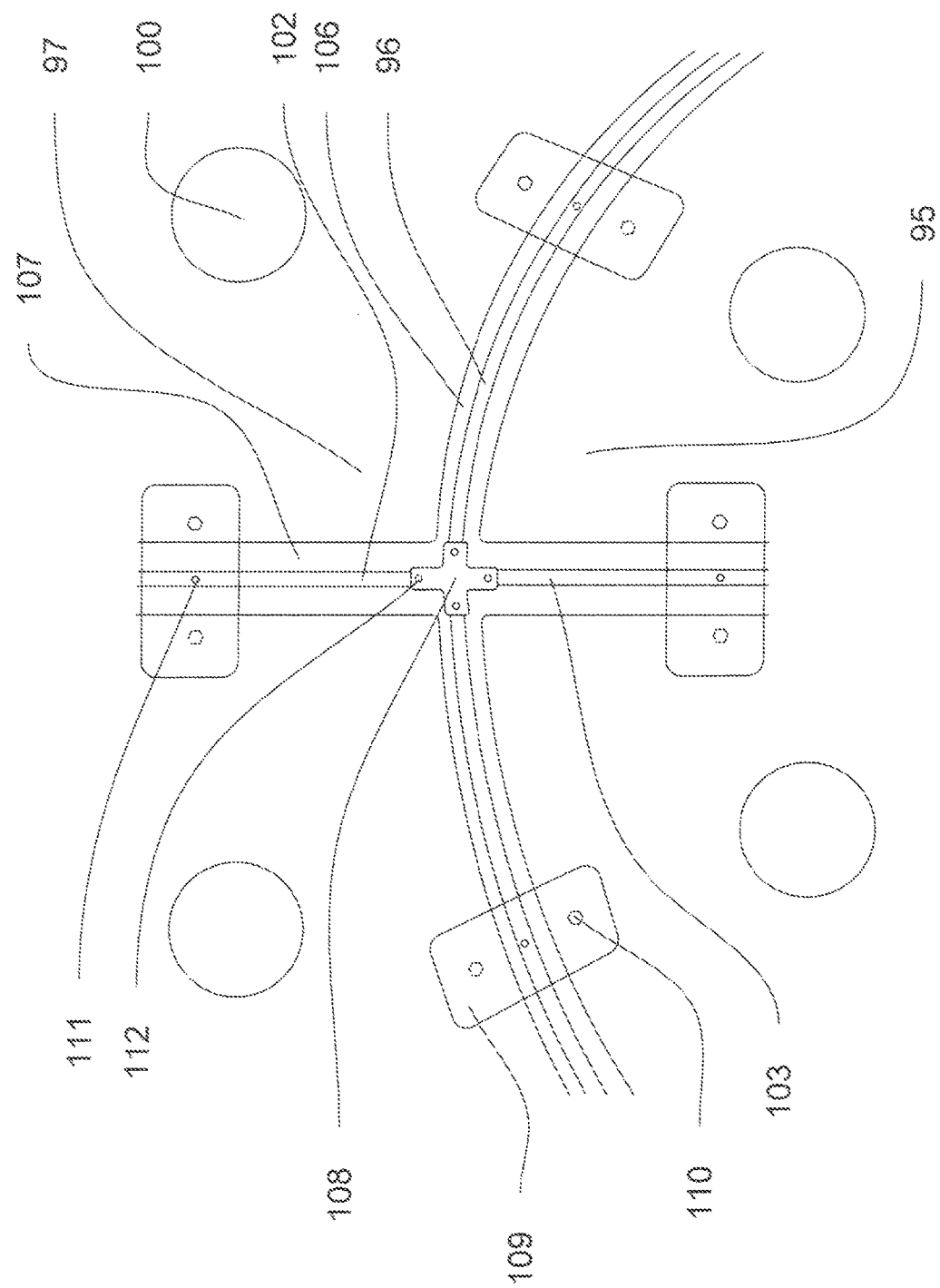

FIG. 10 along circle 101 on FIG. 9 shows some details of the connectors and preparation for placing the mirror in the structure. To allow the wind to pass through the mirror, each mirror segment has a plurality of holes 100 and in addition, there are spaces or openings between the structure and the mirror segments, with concentric spaces 106 between the arcs and the mirror segments and radial spaces 107 between the struts and the mirror segments purposely left surrounding the mirror. The space or void, is provided by purposely using longer mirror holding lips 109 attached to either one of the concentric circles or one of the struts. Depending on the location on the mirror, the holding lips can attach two mirror segments, as illustrated by the double holding lip 109, but could also attach to only one mirror segment and a concentric ring (not shown). As shown in this portion of the embodiment, by attaching the double or single holding lips to pre-drilled perforations on the arc segment of one of the structural circles 96 or one of the radial struts 102 or 103 composing the structure with appropriate fasteners 111, and then attaching the mirror segments into the pre-drilled preparations on said lips with appropriate fasteners 110 to receive the mirror segment, a large mirror can be constructed. Small compression springs (not shown) can be placed between the arcs or struts and the mirror segments fastened to the holding lips, to allow for minute adjustments of the mirror pointing direction, to assure that the alignment meets the desired tolerance. Each concentric circle will be formed by identical arc segments, which will be inserted into the corresponding T or symmetrical X connector (not shown) attached to the corresponding struts fastened by screws into the pre-drilled and tapered holes. The main mirror so constructed with identical pieces, with precise drillings for joining the pieces together, will allow the construction of a precise dish paraboloid collector that will be light yet strong, rigid yet flexible.

Figure 3:
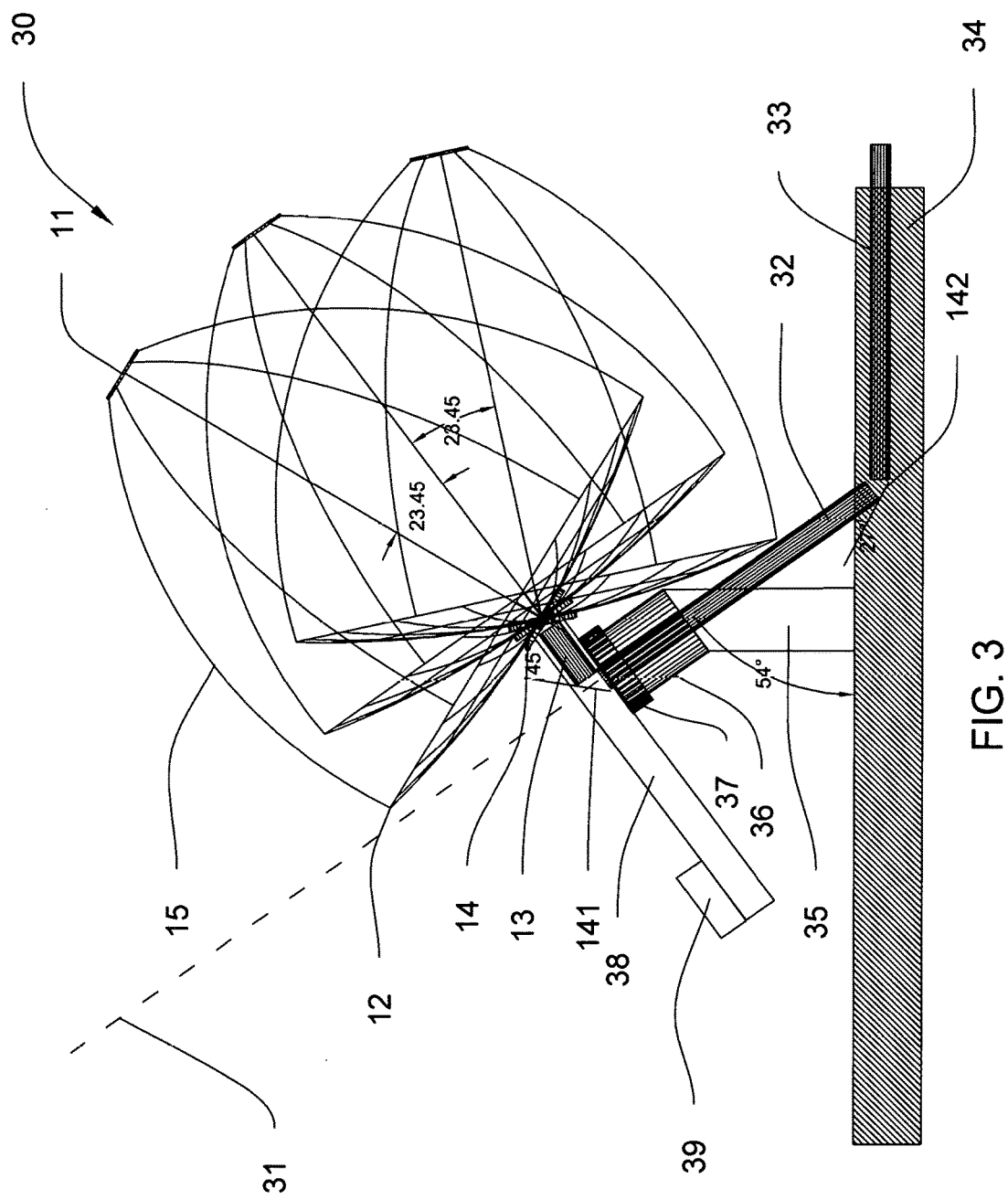
FIG. 3 illustrates a lateral view of the RPDC on the polar mount, showing the support base and the paraboloid dish (it is shown in three tilted positions to cope with the annual change of declination as it moves with the seasons), and the way the light pipes redirect the concentrated sun rays to the fixed center on the arm of the support base and then along the fixed line to the foundation of the structure, where it is finally redirected to the desired location.

The sun tracking mechanism consists of two movements: a polar movement and a declination movement. The emphasis is in a simple and predictable movement to be able to achieve the needed accuracy. FIG. 3 shows a lateral view of the proposed RPDC 30 on a polar mount and depicting the intended declination movement for the RPDC. It consists of a large concrete base 34, a proper foundation to provide the desired stability, supporting and anchoring a vertical base 35 which is shown here as the preferred embodiment as being made out of a large diameter pipe segment (some 20-30 inches), which is anchored to the concrete base by flanges and bolts (not shown) with either compression springs, small wedges or a hard rubber like gasket (not shown) to insure that the vertical base is truly vertical. The holes in the flange for the bolts of the vertical base are made slightly larger than the size of the bolts to allow slight movement of the vertical base for exact orientation. The vertical base is truncated in the upper part at an angle that is preferably as close as possible to the site's latitude. Attached to the vertical base is an axis base 36, preferably in this embodiment as another pipe segment of similar diameter as the vertical base, which can be fastened to the vertical base with the plane connecting the axis base pipe segment precisely oriented at such angle that corresponds to the site's latitude and pointing to True North, shown as the broken line 31, by special flanges (larger than customary to attach the truncated ellipse with a circle), using standard means of fastening (not shown), again using compression springs, wedges or a gasket for adjusting the axial base into its final position and orientation. The upper portion of the axis base will include the polar sun tracking mechanism enclosed within the sun tracking polar axis cap 37. Attached to the upper part of the sun tracking polar axis cap, there are beam supports 38 holding the main mirror 10 in one extreme and a counterbalancing weight 39 on the other extreme. Also shown on FIG. 3, superimposed for clarity, although not actually visible, are the three needed light pipes: (a) the central light pipe 13, attached to the metallic structure, the inner ring of the main mirror and the support base of the main mirror that receives the re-reflected rays from the re-reflecting mirror and terminating shortly before the axial mirror 141, (not totally visible because it is located between the beam supports); (b) the axial light pipe 32 that receives the concentrated rays from the axial mirror and delivers the concentrated rays to the cavity mirror 142 (the axial light pipe is not visible while inside the axial base); and (c) the cavity light pipe 33, that receives the concentrated rays from the axial light pipe via the cavity mirror and delivers it into the cavity-receiver (the cavity light pipe is not visible because it is to be located inside the inferred trench in the concrete base).

The axis base needs to be oriented precisely to True North (the exact point corresponding to the Earth's axis of rotation, near the Polar Star). Since the focusing tolerance available is so small, precise construction and erection is needed. The vertical base needs to be truly vertical, the axis base needs to be attached at the proper angle and the unit must point directly to True North. Rather than relying on perfect parts and erection, it is safer to provide for strong yet flexible adjustment. The adjustable mechanism needs to be strong enough to support the moving collector without drifting during the day or lifetime. The proposed solution is probably the less expensive alternative that meets those requirements.

Figure 4:
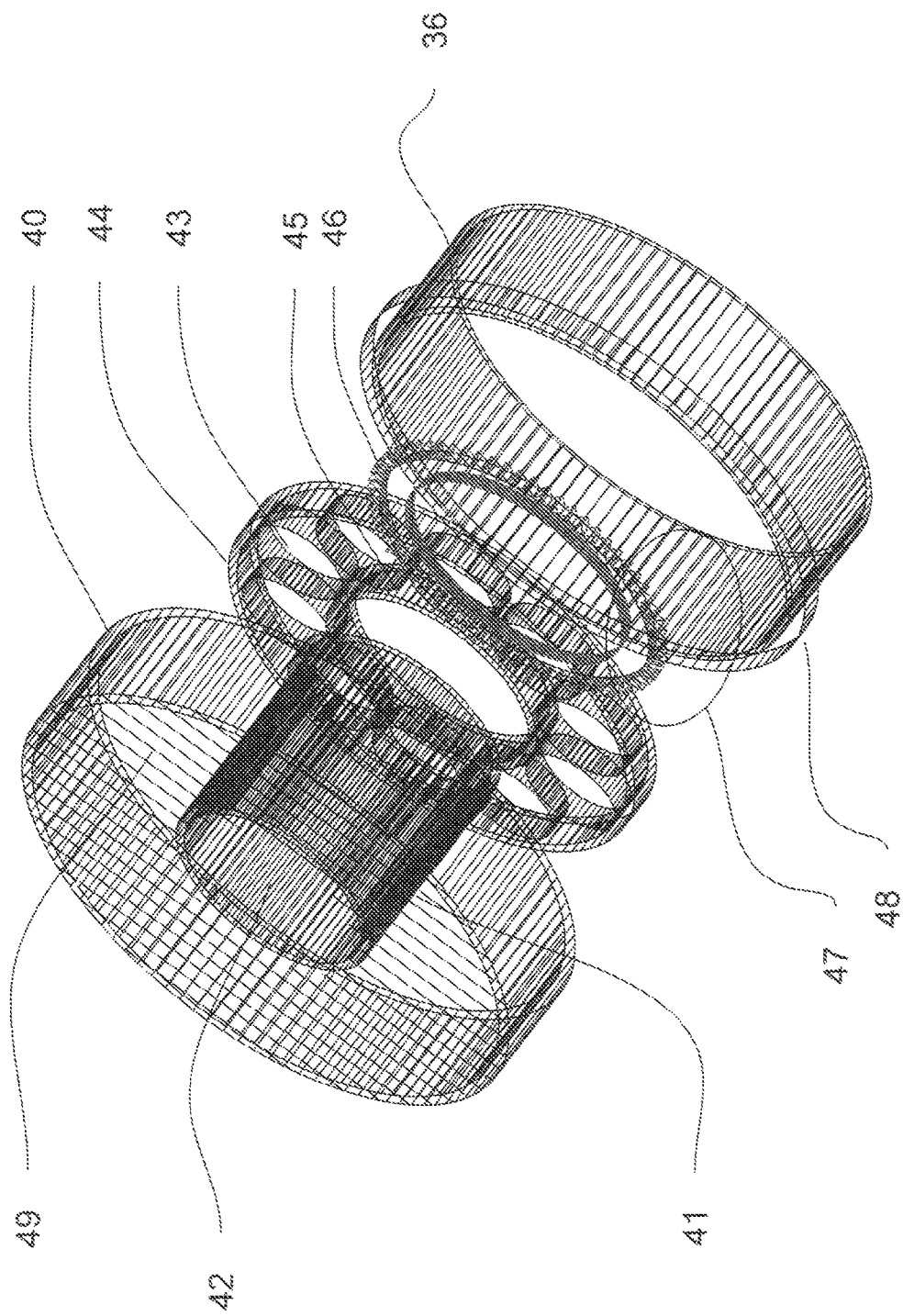

FIG. 4 shows an exploded view of the polar sun-tracking mechanisms, looking inside the polar axis cap 37. The polar axis cap has an outer lip 40 with a diameter slightly larger than the axis base 32 and an inner lip 41 with a diameter slightly larger than the diameter of the axial light pipe (not shown). A large roller bearing 43 is firmly attached to the outside wall of the inner lip with the inner ring 44 of the roller bearing while the outer ring 45 is firmly attached to the inner wall of the axis base. An axis gear 46 is attached to the outmost extreme of the inner lip. The rest of the mechanism is shown in FIG. 7C as a cut-out along area 47 of FIG. 4. It consists of a complementary gear 53 attached to a servo-motor 52 which is fastened to the axial support wall 50 of the axis base. The servo-motor is fastened to the axial support wall with flexible means of fastening 51, including tension springs (not shown) to absorb pressure from the axis gear if the cap twists, maintaining tension in the connection but preventing damage to the gears. Furthermore, the servo-motor includes means of disengaging the gears such as a disengaging clutch 54 which will allow decoupling the gears in the event of heavy winds, allowing the mirror to swing freely around the polar tracking mechanism. To assist the roller bearing in maintaining the paraboloid dish collector in place despite wind gusts, radial rubber segments 48 can be attached to either the outmost portion of the axial base or to the inside of the cap's outer lip, which will dampen the bending movement on the cap, relieving stress on the roller bearing.

The polar sun-tracking mechanism is simple yet robust and includes the elements to dampen sporadic and unpredictable twists that wind gust will be imposing on the mechanism. The servo motor, controlled by a micro-processor or other means, provides the needed steady rotational movement. The signals to the servo will be timed following apparent time (actual local time corrected by the equation of time and the needed corrections to adjust for sidereal/solar time). Since the mirror might have to be stopped when the wind velocity exceeds a prudent threshold or during the night, the micro-processors would have to re-orient the mirror to the desired position every morning or after the wind subsides.

If the objective was tracking a star, the polar tracking mechanism would suffice. Unfortunately, the sun is much closer and the earth moves around the sun in a path that is inclined with respect to the celestial equator (the ecliptic) and the sun appears to be north of the celestial equator during the summer and below the celestial equator during the winter. To properly trace the sun with a polar mount, the paraboloid dish collector needs to change its declination to point north of the equatorial celestial plane during the summer and south during the winter. The sinusoidal movement is periodic and predictable, but not necessarily constant, with small correction needed during the solstices and almost hourly adjustments during the equinoxes to maintain the desired precision.

Figure 5:
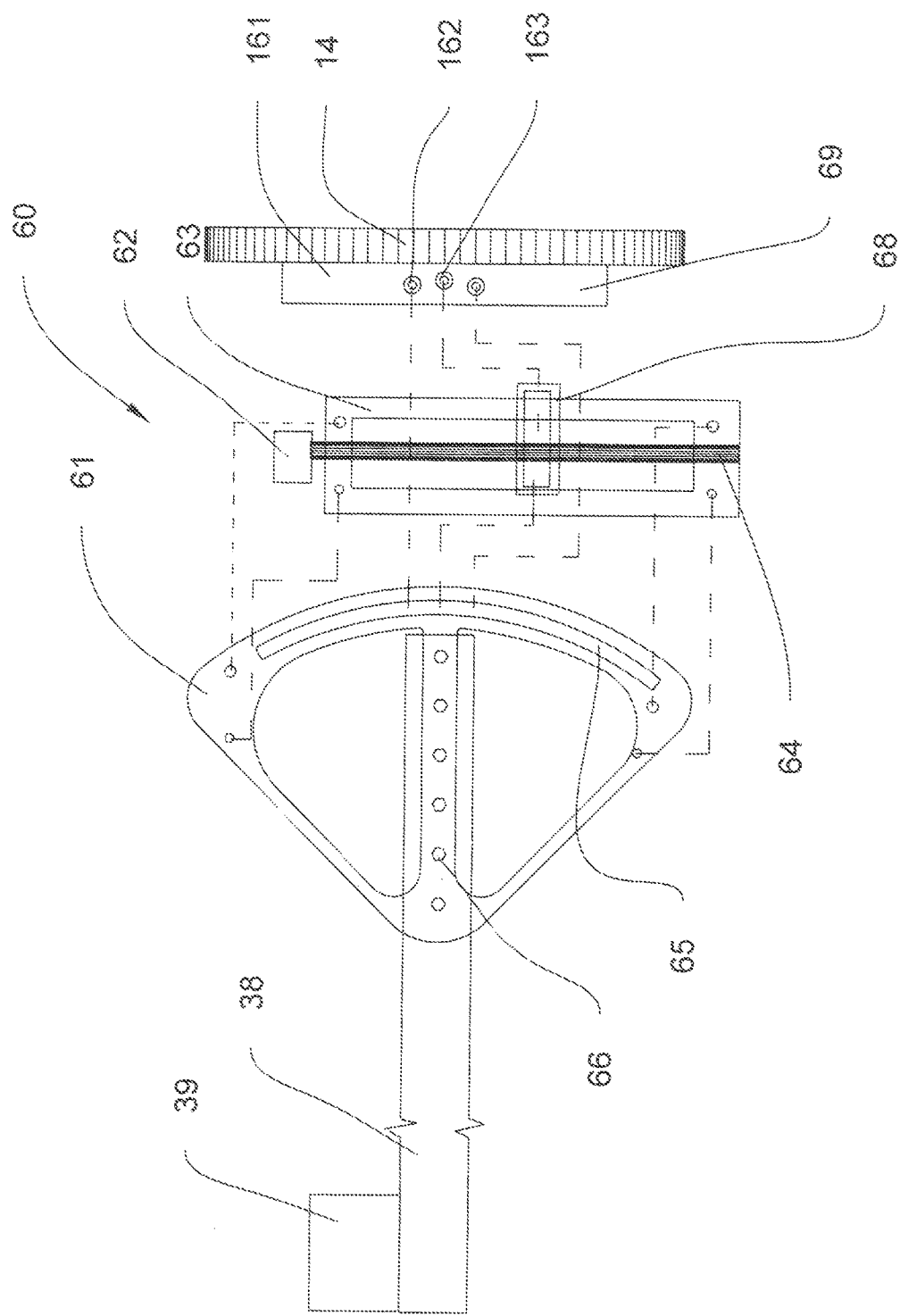
FIG. 5 shows an exploded view of the declination moving mechanism, with an arc guide attached at the base of the mirror and a displacement bar to move the mirror along the guide.

FIG. 5 shows an exploded lateral view of the declination tracking mechanism 60. The mechanism is attached to the support beams 38 that are attached to the polar axis cap on top of the polar axis tracking mechanism. To compensate for the weight of the mirror, at the other extreme of the support beams, a counterbalancing weight 39 is fastened. A radial guide 61 (there are two symmetric systems; one on each of the support beams but the description is in singular, as seen with the RPDC system at the right hand side). The radial guide is attached to the support beam by a plurality of fasteners 66. The purpose of the radial guide is to provide for a circular motion to the mirror base 69 that is attached to the central support dish, in a circle that has as the center a point that is in the axis of the polar tracking mechanism to assure that as the mirror moves, the light pipe (not shown) attached to the mirror also moves, and the axial mirror (not shown) redirects the concentrated rays into the axial light pipe. The mirror base is rectangular, dimensioned to fit between the two radial guides and is either welded or fastened to the central support dish. Attached to the mirror base are three pegs or prongs, located in an arc with the same radius of the arc of the circular guide 65 (the perforation or hole in the radial guide). The two outer prongs 162 have a ball bearing that fits inside such circular guide. The central prong 163 also passes through the circular guide and has a ball bearing, but the ball bearing moves inside the vertical guide 68. The movement of the mirror is produced by a servo-motor 62 that is coupled to a endless threaded shaft 64 that rotates freely with ball bearings (not shown) inside a declination guide box 63 that is fastened to the radial guide with fasteners 67. The movement of the endless threaded shaft causes the vertical guide to move up or down, forcing the mirror to move along the circular guide 65. The radial guide and the circular guide are not symmetric. In theory, the mirror only needs to swing up and down 23.45° from the center to accommodate the declination changes, but the radial guide and the circular guide are slightly larger on the lower side (the lower arc angle should correspond to the latitude angle), to allow the mirror to be placed vertically in the event of high winds.

The vertical guide allows the ball bearing attached to the central prong to be displaced horizontally in and out, depending on the position along the circle. The horizontal movement corresponds to the radius of the circular guide and the cosine of the angle the central prong is displaced with respect to the center of said circular guide. To facilitate the movement of the mirror but also to provide a stabilization force against wind gusts, two shock absorbers, springs or other means of dampening movement (not shown) are connected from the center point of the beam support that corresponds to the axis of the polar tracking mechanism and one of the concentric circles that is part of the metallic structure that forms the main mirror. Both shock absorbers are connected to the same concentric circle, one above the support beam and the second one below the support beam. Both the mirror base and the mirror move freely in circular paths centered in the same spot, and thus properly tensed and/or dimensioned dampening means will dampen any movement produced by the wind.

During periods of high winds, the main mirror might need to be moved to such position that offers less wind resistance. The proposed solution is simple and economic, using the existing infrastructure. A first measure, discussed above, consists of using a longer lower arc in the circular guide which would allow placing the main mirror vertically, to minimize possible lift. A second measure consists of disengaging the polar axis tracking mechanism which would allow the main mirror to move freely around the ball bearing on the polar axis. Naturally, the main mirror will either face or back the wind, depending on the way the main mirror was facing the wind when the polar axis mechanism was disengaged. Backing the wind is the preferred alternative. Therefore, prior to disengaging the polar axis mechanism, the mirror needs to be turned to a point that a portion of the back faces the wind. A third measure is needed because placing the main mirror perpendicular to the wind minimizes the exposed area. This is accomplished by using a small, 1 m² rudder shaped wind vane (not shown) mounted on top of the counterweight structure, at the other extreme of the main mirror. The wind vane would normally move freely with the wind, but that can be locked, and moved with a signal into the desired position, assisting in turning the mirror. Once the main mirror is perpendicular to the wind it will offer less resistance and together with the wind vane, will self correct with shifting gusts.

The invention requires a minimum of four mirrors: (a) the paraboloid dish mirror or main mirror whose main purpose is to capture the solar irradiation; (b) the re-reflection mirror, a smaller paraboloid mirror located above the main mirror that captures the reflected rays from the main mirror and re-reflects them to the central light pipe; (c) the axial mirror, located at the end of the central light pipe to re-direct the concentrated rays into the axial light pipe, inside the polar tracking mechanism, and; (d) the cavity mirror that redirect the rays coming from the axial light pipe into the cavity light pipe. The axial and cavity mirrors should be preferably plane, but a carefully selected slight curvature (concave) to reduce dispersion of the concentrated rays might be useful.

Two mirrors need to be moved: (a) the main mirror moved along the two axes, the polar axis and the declination axis, and; (b) the axial mirror, so that when the main mirror is moved along the declination axis, the axial mirror is moved to reflect the incoming irradiation into the axial light pipe. There are two simple alternatives to move the axial mirror: (a) a simple mechanism with an electric motor that will be receiving simultaneously, a proportional signal to the signal sent to the axial declination servo to adjust the main mirror, so that when the declination servo receives a signal to move, the axial mirror moves at the same time, or; (b) a simple, gravity actuated weight that moves a gear which in turn, moves a complementary gear to move the mirror. The re-reflecting mirror and the cavity mirror are fixed at the desired position.

The invention also requires a minimum of three light pipes: (a) the central light pipe connected to the center of the main mirror and directing the light to the axis mirror; (b) the axis light pipe, inside the axial base, receiving the light from the axis mirror and transporting the light to the cavity mirror, and; (c) the cavity light pipe, inside a trench on the concrete base, that transfers the light from the cavity mirror to the cavity. The length of the pipes is different. The cavity light pipe should be oriented towards the cavity-receiver to avoid having to re-direct again the concentrated rays. To capture some of the heat lost as some of the concentrated rays hit the light pipes, it might be advisable in an alternative embodiment, to enclose at least the exposed portion of the axial light pipe and the cavity light pipe inside another pipe with the chosen working fluid flowing the annular area in the same direction of the light, pre-heating the working fluid. Counter-current flow might be thermally more effective, but co-current flow minimizes the thermal losses of the pre-heated working fluid and centralizes the hot area around the cavity.

FIG. 7A shows a frontal view of a light pipe 70. It is formed by a glass pipe 71 to which a mirror substance 72 (silver or aluminum compounds) has been deposited on the outside surface of the glass pipe following standard mirroring techniques (silvering, sputtering or vacuum depositing) and an additional paint, substrate or a passivation-protective layer 73 to protect the mirror substance. There is experience in the industry to cover curved surfaces with mirror like substances. In the alternative embodiment of placing the light pipe inside another pipe with the working fluid, having the mirror or silvering method used in the inside of the glass pipe and covering the mirror substance with a protective transparent substance, would ease concerns about corrosion by the working fluid.

FIG. 7B shows a composite view of a portion of a light pipe 76 presenting a ray diagram inside the mirror as if said mirror was transparent, with a multitude or concentrated rays 75, assuming that the rays are coming slightly off the longitudinal axis of the pipe, and focusing around the middle of the segment, and therefore some of the concentrated rays hit the mirror substance at a small angle and get reflected back into the pipe, to hit against the opposite wall of the mirror some distance downstream of the pipe. Even if the bulk of the concentrated rays are perfectly aligned with the longitudinal axis of the pipe, since the rays are not perfectly parallel but maintain the angular momentum of the sun's rays, some rays will be bouncing back and forth from the walls of the light pipe. The ray diagram does not show small deviations due to the glass index of refraction. The effect is minimal given the large ratio between the light pipe diameter and the thickness of the glass. With each bounce some energy is transformed into thermal energy. Small misalignment might result in thermal energy building up in the light pipe which could be recovered, if enclosed with another pipe carrying working fluid as mentioned in an alternative embodiment.

Despite the simplicity of the predictable movements with the sun tracking mechanism, means to provide additional adjustments are needed with a separate control loop that will be utilizing photo-detectors to correct, if needed: (a) faulty signals from the micro-processor to move the RPDC along either one of the axes; (b) any misalignment of the base and polar axis due to settlement or wear, or; (c) restore the RPDC to its intended position following a shut-down for maintenance or expected high winds. Four photo-detectors, aligned with the four cardinal points, nearby the central light pipe, with a simple control mechanism, would provide corrective signals to orient the RPDC. To protect the photo-detectors from concentrated solar irradiation, it is preferable to put a shadow disk around the re-reflecting mirror and place the photo-detectors outside the shadow ring, exposing said photo-detectors only to direct solar irradiation, as shown in FIG. 6A, which shows a lateral view of the arrangement. The re-reflecting mirror has a shadow ring 81 surrounding said re-reflecting mirror and extending some 5 cm out. The shadow ring is part of the metallic structure that is holding the re-reflecting mirror in place and will be supported by the metallic struts 15 (not shown) attached to it. The shadow ring will cast a shadow on the main mirror, surrounding the concentrated rays that are aimed to the central light pipe. A plurality of photo-detectors 84 will be placed radially from the center point of the central light pipe, near the edge of the shadow projected by the shadow ring, on the main mirror, and thus will have direct solar irradiation hitting them directly. If there is a misalignment, one or more of the photo-detectors will be first covered by the shadow and will transmit lower voltage to a controller that would trigger movement of the mirror. FIG. 6B shows a top view of the location of the photo-detectors on the main dish, with the shadow cast by the shadow ring and a truncated portion of the metallic struts, herein designated as 15A. The shadows show areas of umbra 82 and penumbra 83. The controlling mechanism is shown in Cordy's patent.

A cavity or solar furnace, herein referred as the cavity-receiver, is a well insulated enclosure with small openings or apertures, to let the radiation in. To assure a better distribution of the captured heat and avoid problems with overheating unevenly the tubes where the working fluid will be circulating, in the preferred embodiment, the solar irradiation coming in from the light pipes is used to heat directly the working fluid in the cavity-receiver. FIG. 8A shows a top view of a sketch of the cavity-receiver 120 (without the top), consisting of a cylindrical pressure vessel 121, surrounded by a thick layer of insulation 134. The cavity-receiver has a plurality of cavity ports or openings 124 where the incoming concentrated solar irradiation coming inside the cavity light pipes 33 enters the cavity-receiver. The path of the cavity light pipes should be properly aligned so that none of the ports should face another port on a straight line. Each of the ports is covered by a thick silica glass 125. FIG. 8B shows a sketch of a lateral view of the cavity-receiver. The cavity-receiver is fed by a liquid working fluid line 128, which is controlled by a valve and level signals (not shown), and an outlet line 129, that takes the steam or vapor of the working fluid to the power center. A demister 131, in top of the cavity-receiver, separates entrapped liquid drops of working fluid from the vapor or steam of the working fluid. A different cavity-receiver for thermal or photo-chemical reactions would be needed but it is outside the scope of this invention.

Figure 11:
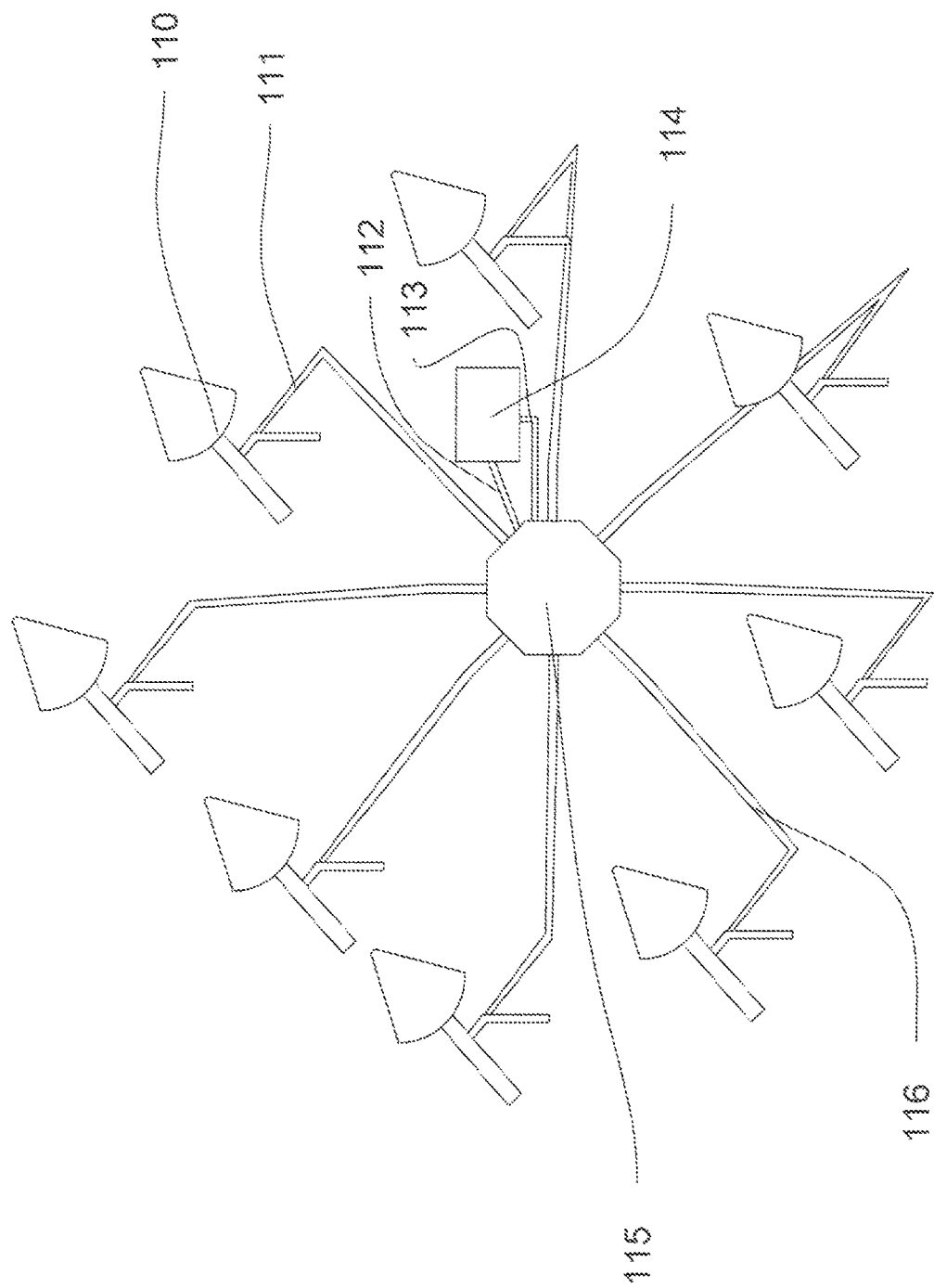
FIG. 11 shows a sketch of a plurality of RPDC sending the concentrated solar irradiation to a central cavity to feed a power station.

Finally, FIG. 11 shows a potential embodiment of the invention with a plurality of RPDC 110 connected via the axial light pipes that are connected to the cavity light pipes into a cavity-receiver 115 where steam is produced and is transferred to a power center 114 via steam pipe line 113 where the steam is used to move a turbine. A condenser (not shown) condenses the spent steam and returns it to the cavity-receiver via recirculation pipeline 112.

Other embodiments are possible, utilizing lenses and mirrors to have many of the cavity light pipes merge the light into a plurality of light manifolds and the light manifolds delivering further concentrated solar irradiation to the cavity-receiver, or utilizing the concentrated rays into the cavity-receiver to heat molten salts or metals to store energy for night use, or using the concentrated rays in thermo or photochemical reactions to produce hydrogen.

Certain features of this invention might sometimes be used to advantage without a corresponding use of other features. While specific embodiments of the invention have been shown and described in detail to illustrate the application of the principles of the invention, it will be understood that the invention may be embodied otherwise without departing from such principles. It is, therefore, apparent that there is provided in accordance with the present invention, a system and method for solar energy capture and conversion. While this invention has been described in conjunction with a number of embodiments, it is evident that many alternatives, modifications and variations would be or are apparent to those of ordinary skills in the applicable arts. Accordingly, this invention intends to embrace all such alternatives, modifications, equivalents and variations that are within the spirit and scope of this invention.

LIST OF REFERENCES

FIG. 1 —Re-reflecting Paraboloid Dish (Pat7_FIG. 1)
10 Re-reflecting Paraboloid Dish
11 Re-reflecting Mirror
12 Paraboloid Dish or Main Mirror
13 Central Light Pipe
14 Central Support Dish
15 Metallic Struts
16 Metallic Structure
17 Mirror Segments
FIG. 2A to FIG. 2D —Light Rays into RPDC (Pat7_FIG.2a) (Pat7_FIG.2bcd)
13 Central Light Pipe
20 Frontal View of RPCD
23 Axial Mirror
24 Sun rays impinging Main Mirror
25 Reflected rays from Main Mirror
26 Re-reflected Rays
27 Opening or hole in Main Mirror
28 Axial Light Pipe
FIG. 3 —Re-reflecting Paraboloid Dish Collector ("RPDC") (Pat7_FIG.3)
30 Polar Sun-tracking mechanism
31 Polar Axis
32 Axial Light Pipe
33 Cavity Light Pipe
34 Concrete Base
35 Vertical Base
36 Axis Base
37 Polar Axis Cap
38 Support Beam
39 Counterbalancing Weight
141 Axial Mirror
142 Cavity Mirror
FIG. 4 Details of Polar Sun-tracking mechanism (Pat7_FIG.4a)
40 Cap Outer lip
41 Cap Inner lip
32 Axial Light Pipe
43 Roller Bearing
44 Inner ring of Roller Bearing
45 Outer ring of Roller Bearing
46 Axis Gear
47 Cut off for details
48 Absorber Ring
49 Top of Cap
FIG. 5 —Declination Tracking Mechanism (Pat7_FIG.5)
60 Declination Tracking Mechanism
14 Central Support Disk
61 Radial Guide
62 Servo Motor
63 Declination Guide Box
64 Endless threaded Shaft
65 Circular Guide
66 Radial Guide Fastener
68 Vertical Guide 69 Main Mirror Base
162 Outer Prong
163 Central Prong
FIG. 6A —Side View Photo-detector Position (Pat7_FIG.8a)
80 Side View Photo-Detector Position
81 Shadow Ring
82 Umbra Shadow
83 Penumbra Shadow
84 Photo-Detector
FIG. 6B —Top View Photo-Detector Position (Pat7_FIG.8a)
15A Segment of Metallic Strut Shadow
FIG. 7A —Front View of Light Pipe (Pat7-FIG.7a)
70 Front View Light Pipe
71 Inner Glass Surface
72 Mirror Surface
73 Paint or Cover Surface
FIG. 7B —Side View Light Pipe (Pat7-FIG.7a)
74 Light Pipe Wall
75 Concentrated Light Rays
76 Side View Light Pipe
FIG. 7C Polar Sun-tracking complement (Pat7-FIG.7a)
32 Axis base
50 Axial Support Wall
51 Servo Flexible Fastener
53 Complementary gear
52 Servo Motor
54 Disengage Clutch
FIG. 8A Top view Cavity-Receiver
120 Cavity-Receiver
121 Pressure Vessel
128 Inflow Working Fluid Conduit
129 Outflow Working Fluid Conduit
124 Cavity Ports
131 Demister
134 High temperature Insulation
FIG. 8B —Side view Cavity-Receiver
125 Thick Silica Glass
FIG. 9 Main Mirror Construction (Pat7-FIG.9a)
91 Inner Circle Mirror Segment
92 First Donut Mirror Segment
93 Structural First Circle
94 Structural Second Circle
95 Second Donut Mirror Segment
96 Structural Third Circle
97 Outer Mirror Segment
98 Structural External Circle
99 Structural Inner Circle
100 Air Hole or Perforation
101 Area to be expanded for detail
102 External Circle Structural Strut
103 Second Donut Structural Strut
104 Inner Circle Structural Strut
105 First Donut Circle Structural Strut
FIG. 10 Detail of Main Mirror Construction (Pat7_FIG.10)
95 Second Donut Mirror Segment
96 Third Circle Structural Arc Segment
97 Outer Mirror Segment
100 Air Hole or Perforation
102 External Circle Structural Strut
103 Second Donut Structural Strut
106 Void or Space between arc segment and mirror
107 Void or Space between strut and mirror
108 Symmetrical X Connector
109 Lip Connector
110 Fastener for Mirror
111 Fastener for Lip Connector
112 Fastener for Connector
FIG. 11 —Top view —RPDC farm (Pat7-FIG.11)
110 RPDC
112 Steam Pipe Line
113 Recirculation Pipe Line
114 Power Center
115 Cavity-receiver What it is claimed is:

1. A solar energy concentrating system formed by at least one re-reflecting paraboloid dish collector, each re-reflecting paraboloid dish collector focusing solar irradiation into concentrated rays and redirecting said concentrated rays to at least one cavity-receiver;
   wherein each of the re-reflecting paraboloid dish collectors consists of:
      four concentrating and/or redirecting mirrors, which include:
         i) a main mirror in the shape of a large paraboloid dish formed by a plurality of paraboloid mirror segments;
         ii) a re-reflecting mirror dimensioned in the range of 5% to 10% of the radius of the main mirror and with a concave surface of said re-reflecting mirror facing a concave surface of the main mirror, said re-reflecting mirror being located at a fixed position above the main mirror at a distance that corresponds to the sum of the focal distances of the main and re-reflecting mirrors, which orients said concentrated rays into being quasi-parallel with each other;
         iii) a flat axial mirror of the same diameter as the re-reflecting mirror, located in the proximity of the intersection of a central light pipe and an axial light pipe, and;
         iv) a flat cavity mirror of the same diameter as the re-reflecting mirror, located in a fixed position at the intersection of the axial light pipe and a cavity light pipe;
      wherein said central light pipe captures the concentrated rays from the re-reflecting mirror and transmits them to the axial mirror;
      wherein said axial light pipe captures the concentrated parallel rays striking the axial mirror and transmits them to the cavity mirror, and;
      wherein said cavity light pipe captures the concentrated rays striking the cavity mirror and transmits them to at least one of said cavity-receivers;
   a precision polar sun-tracking mechanism including:
      i) a polar axis tracking mechanism configured to follow the diurnal sun's movements along a circular path in the celestial sphere and;
      ii) a declination axis tracking mechanism configured to follow and correct the seasonal apparent movement of the sun along its circular path in the celestial sphere;
   means of controlling the movement of the precision polar sun-tracking mechanism and the axial mirror;
   wherein said main mirror has a round opening at the center thereof, said opening being approximately the same diameter as the re-reflecting mirror, allowing the concentrated rays to be transmitted to the central light pipe;
   wherein said central light pipe is a glass pipe having approximately the same diameter as the re-reflecting mirror, connected to the round opening of the main mirror and extending close to the edge of the axial light pipe and having reflective surface means either on the inside or the outside wall of said glass pipe, with said reflective surface covered with protective means;

wherein the eccentricity of said re-reflecting mirror is related to the eccentricity of said main mirror and the ratio of the diameter of said main and re-reflecting mirrors;

wherein the at least one cavity-receiver is a pressure vessel with means of transferring the heat provided by the concentrated solar irradiation to a working fluid.

2. The solar energy concentrating system of claim 1 wherein said axial light pipe is a second segment of the same glass pipe as the one used by the central light pipe, located at the center of a polar axis tracking mechanism, starting at the top of said tracking mechanism and continuing on a straight line to the edge of the cavity light pipe.

3. The solar energy concentrating system of claim 1 wherein said axial mirror is a movable flat mirror that bisects an angle formed by the central light pipe and the axial light pipe, oriented to reflect concentrated rays into the axial light pipe, said axial mirror controlled by movement of the declination axis tracking mechanism.

4. The solar energy concentrating system of claim 1 wherein said cavity light pipe is a third segment of the same glass pipe starting approximately at the intersection of the axial light pipe and running on a straight line along a cavity pipe trench or ditch, to one of the cavity-receivers and said cavity light pipe having the reflective surface means on the inside of said cavity light pipe and located inside another sturdier pipe of larger diameter pipe with the annular space between the two pipes used to pre-heat the working fluid used by the cavity-receiver.

5. The solar energy concentrating system of claim 1 wherein the precision polar sun-tracking mechanism consists of:
   a) a base formed by two segments of a large diameter pipe or hollowed pole, the first segment with one straight cut perpendicular to the longitudinal axis of said large diameter pipe or hollowed pole, and with the other extreme cut at an angle that is similar to the latitude where the solar concentrating system is to be located and said first segment of the large diameter pipe or hollowed pole is fastened vertically to a horizontal concrete base, with adjustable fastening means that include flexible joints, slims, compression springs, gaskets or other adjustable fasteners and with the second large diameter pipe or hollowed pole segment welded or attached by other means to the truncated cut of the first segment large diameter pipe or hollowed pole, having the inclined segment oriented and pointing to the vicinity of the Polaris star or true north, tightening the flexible fasteners once the desired orientation is secured;
   b) a fully rotating polar axis cap that covers the free end of the inclined large diameter pipe or hollowed pole segment, which is terminated with a straight cut perpendicular to the longitudinal axis of said large diameter pipe or hollowed pole, with means of rotating said rotating polar axis cap which by construction said rotating polar axis cap is perpendicular to the north pole and therefore creates an equatorial rotating surface, and;
   c) means of attaching a support beam or structure to said equatorial rotating surface to attach the main mirror and a counterbalancing weight to said main mirror and house the declination sun tracking mechanism and the central light pipe.

6. The solar energy concentrating system of claim 5 wherein the means of rotating the equatorial surface of the rotating polar axis cap attached to the inclined segment of the pipe or hollowed pole has a central opening, hole or perforation dimensioned to accept the axial light pipe and said means of rotating the equatorial rotating surface includes means to dampen or prevent possible interference with winds that might misalign the main mirror.

7. The solar energy concentrating system of claim 1 wherein the declination axis tracking mechanism consists of:
   a) means of attaching the main mirror to said declination axis mechanism thereto the beam or structure that is attached to the rotating equatorial surface, and;
   b) means of changing the inclination of the main mirror by the declination axis mechanism up and down with respect to the equatorial rotating surface.

8. The solar energy concentrating system of claim 1 wherein the cavity light pipe is placed on a ditch or trench starting on a horizontal concrete base, where the axial light pipe intersects said horizontal concrete base, and extends the length of the concrete base towards the cavity-receiver, and continues on the ground all the way to said cavity-receiver, and said trench or ditch is dimensioned to allow the cavity light pipe and a sturdier pipe to lay underground.

* * * * *